F. WHITNEY.
ROLLER BEARING.
APPLICATION FILED JUNE 23, 1910.
983,792.
Patented Feb. 7, 1911.
2 SHEETS—SHEET 2.
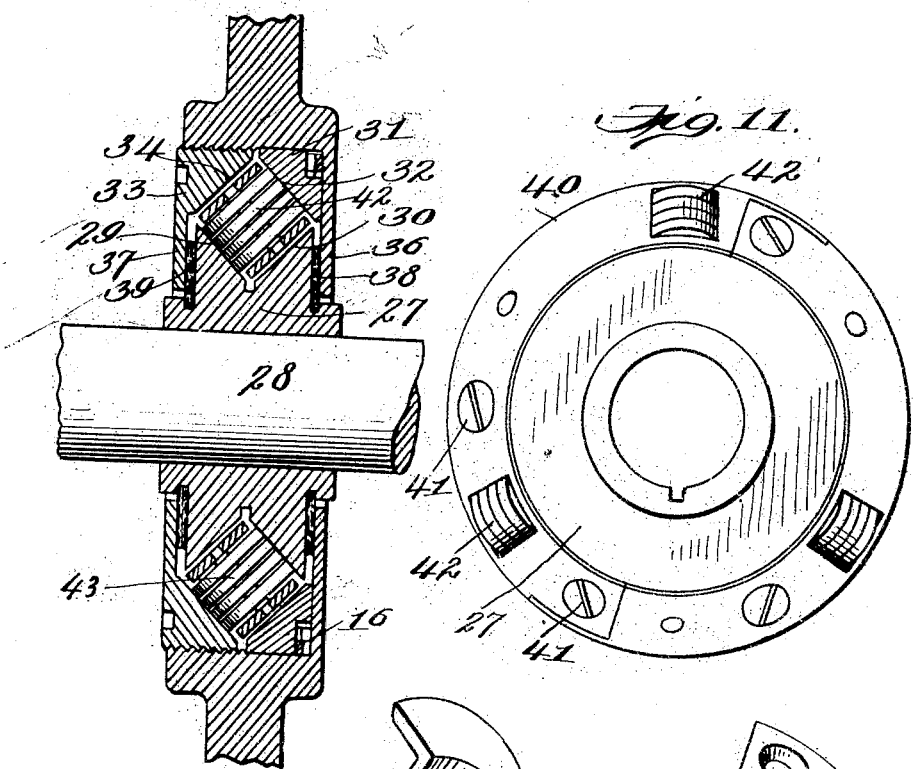
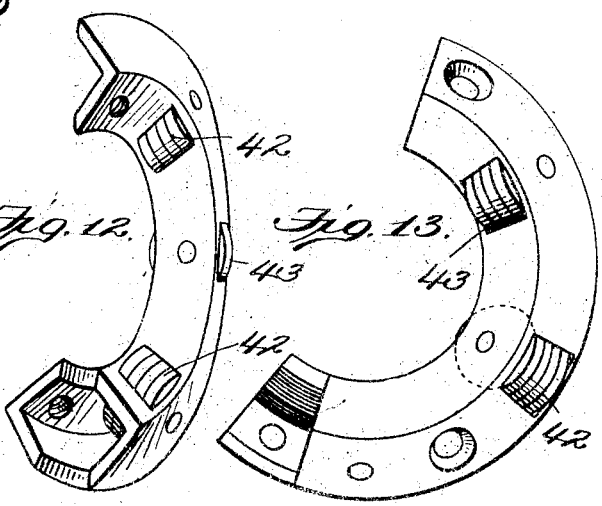
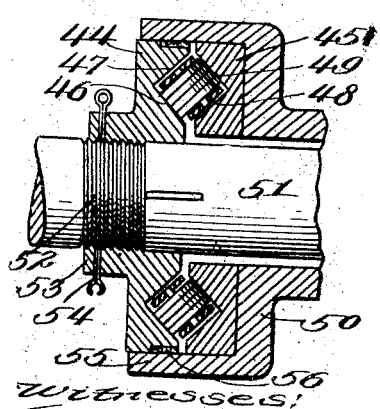
Witnesses:
Inventor
Frank Whitney

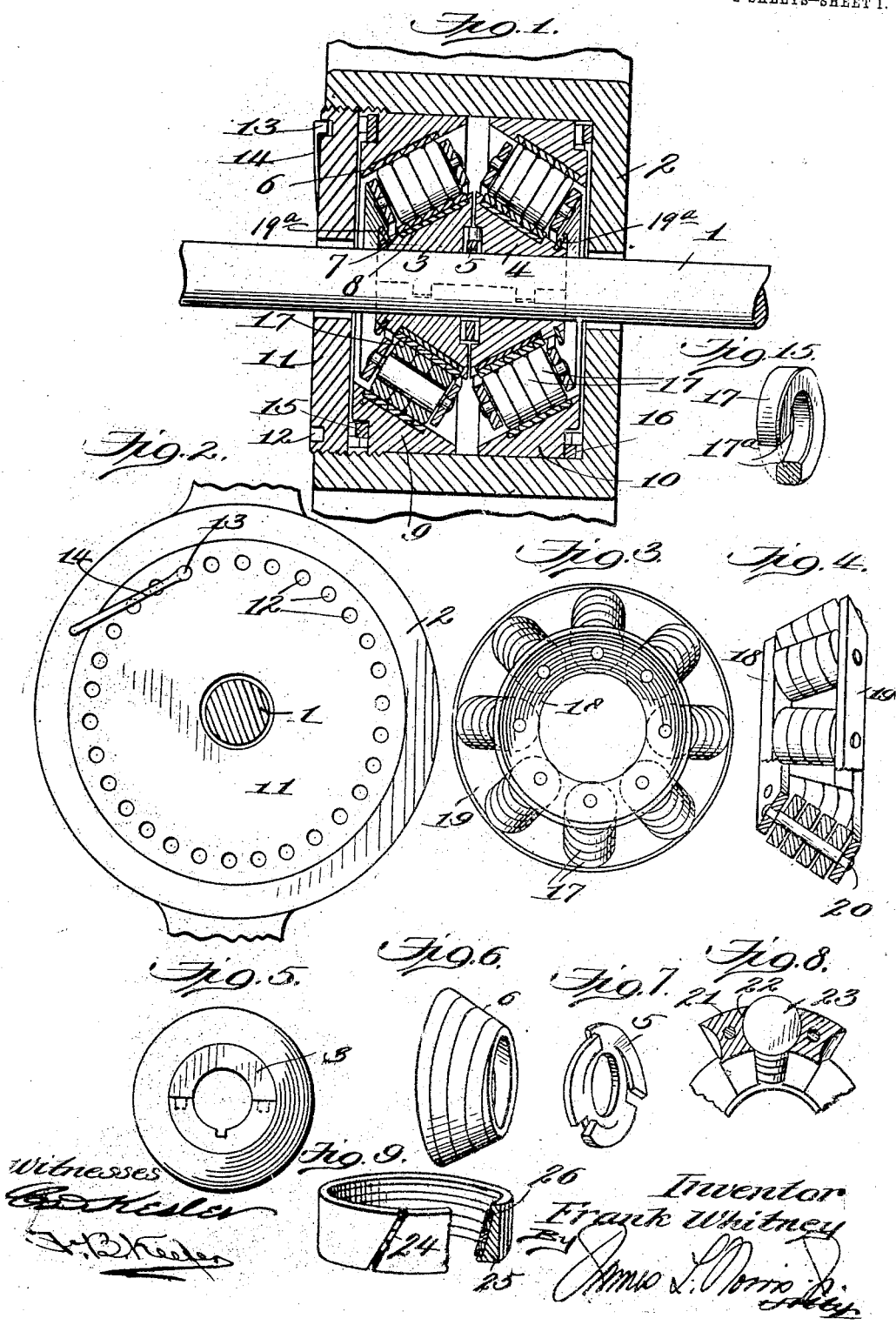

UNITED STATES PATENT OFFICE.

FRANK WHITNEY, OF HUBBARD WOODS, ILLINOIS.

ROLLER-BEARING.

983,792.

Specification of Letters Patent. Patented Feb. 7, 1911.

Application filed June 23, 1910. Serial No. 568,488.

*To all whom it may concern:*

Be it known that I, FRANK WHITNEY, a citizen of the United States, residing at Hubbard Woods, in the county of Cook and State of Illinois, have invented new and useful Improvements in Roller-Bearings, of which the following is a specification.

My present invention relates to improvements in roller bearings, and it has for its object primarily to provide an improved bearing which embodies pairs of cone surfaces, the cone surfaces of each pair being of the same angle, and the cone surfaces of one pair being arranged at the same angle but inclined in an opposite direction with respect to the cone surfaces of another pair, in combination with sets of roller elements, one set of roller elements coöperating with each pair of cone surfaces, and each roller element being of a composite structure, that is to say, it is built up of a plurality of axially alined rollers having narrow faces, each roller element being cylindrical in form so as to obtain an even bearing upon the opposed cone surfaces, and the composite formation of the roller elements enabling them to roll upon the cone surfaces without breaking or undue friction notwithstanding the differential paths over which the rollers of the roller elements travel.

Another object of the invention is to provide a roller bearing which when once adjusted is capable of automatically maintaining such adjustment, and also a bearing wherein the inner and outer cones and the roller engaging surfaces thereof are capable of adjusting themselves accurately to the size and shape of the shaft or journal and the journal box or casing, whereby the expense of grinding is obviated, the adjustable outer cone surface and the inner cone surface being preferably provided with hardened linings which are not only capable of automatically accommodating themselves to the cone surfaces and to the coöperating roller elements, but such linings when formed of resilient material have a tendency to contract and expand respectively, thereby binding the inner cone or cones upon the shaft or journal, and the outer cone or cones within the box or casing, driving fits between these parts being therefore unnecessary.

Further objects of the invention are to provide devices for automatically maintaining a proper rolling engagement between the roller elements and the cone surfaces whereby the load or pressure shall be distributed evenly between all of the roller elements, thus avoiding breakage of the parts, and to maintain a proper adjustment of the bearing and thereby take up any radial or thrust motion that would otherwise occur owing to wear or other causes.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a section of a roller bearing constructed in accordance with my present invention; Fig. 2 is an end elevation of the bearing as viewed from the left in Fig. 1; Fig. 3 is an end view of one of the roller cages removed from the bearing; Fig. 4 is a detail side elevation of the roller cage as shown in Fig. 3, a portion of the view being shown in section to illustrate the construction and manner of mounting the rollers composing each roller element; Fig. 5 represents an end elevation of one of the inner cones; Fig. 6 is a perspective view of a hardened and automatically adjustable bushing or lining for one of the inner cones; Fig. 7 is a perspective view of an expansible washer which is adapted to be mounted between the pair of opposed inner cones in the construction shown in Fig. 1 for effecting an automatic adjustment of such cones; Fig. 8 is a detail view of a portion of a modified form of cage for the roller elements; Fig. 9 is a detail view of one of the outer cones and its hardened bushing or lining; Fig. 10 represents a section of another form of bearing embodying substantially the principles involved in the form shown in Figs. 1 to 9 inclusive, the two sets of roller elements in Fig. 10, however, being arranged in tandem relation; Fig. 11 represents an end elevation of the bearing as shown in Fig. 10 with the casing embodying the outer cones removed; Fig. 12 is a detail perspective view of a portion of the cage for the roller elements of a bearing constructed as shown in Figs. 10 and 11; Fig. 13 is a side elevation of the section of the cage and contained roller elements as shown in Fig. 12; Fig. 14 is a sectional view of a modification of Fig. 10; and Fig. 15 is a perspective view of one of the sections of the improved composite roller element.

Similar parts are designated by the same reference characters in the several views.

Roller bearings constructed in accordance with my present invention are capable of use generally in all cases where it is desirable or necessary to eliminate or minimize friction. Owing to the various conditions in which the bearing may be used in practice, it is obvious that the construction of the bearing itself and the construction and arrangement of the inner and outer cone surfaces may differ in order that the best results may be obtained. In the present instance, I have shown several embodiments of the invention, but in each case, the main principles of the invention are involved.

In Figs. 1 to 9 inclusive, I have shown an anti-friction bearing which is adapted to sustain relatively heavy loads and one which is capable of sustaining radial and also end thrusts in both directions. In this instance, 1 designates the shaft and 2 designates the housing or casing, the shaft and housing being as usual relatively rotatable. A pair of inner cones 3 and 4 are applied to the shaft and they may be splined upon the shaft so that while there can be no relative rotation between these inner cones and the shaft, the inner cones are capable of a relative axial movement. To enable the bearing to be applied to a crank shaft, each inner cone may be divided or split in sections as shown, and these sections may be maintained in proper relation by dowel pins, as shown, or by any other suitable means.

One of the subsidiary features of my invention involves the provision of means for automatically maintaining a correct adjustment of the bearing to compensate for wear and other conditions. For this purpose, an expansible washer 5 is shown in Fig. 1 as interposed between the inner or adjacent ends of the cones. These inner cones are so placed upon the shaft that their bases are opposed to one another, and their circumferential faces are of the same angle. To facilitate and cheapen the cost of manufacture of the bearing, I prefer to provide the inner cones with hard metal linings or bushings which are capable of accommodating themselves automatically to the respective cones and of providing true rolling surfaces for the roller elements. In the present instance, each lining or bushing 6 is composed of a spirally wound strip of hard metal, the lining or bushing so formed being sprung into a circumferential retaining groove or recess 7 in the respective inner cone. In some cases, it may be necessary to interpose a soft metal backing 8 between the hard metal lining or bushing and the cone. The resilience of the lining or bushing 6 serves to bind its respective cone upon the shaft or journal.

The casing 2 contains a pair of outer cones 9 and 10 the surfaces of which are precisely parallel with the roller engaging surfaces presented by the inner cones 3 and 4. In other words, the pairs of cones 3 and 9 and 4 and 10 are of equal angles. The inner or adjacent ends of the outer cones 9 and 10 which are toward the apices of these outer cones are preferably separated initially a distance sufficient to allow for suitable adjustment, the outer cones 9 and 10 being capable of relative axial movement within the housing or casing 2 for this purpose. One end of the housing 2 may be permanently closed. The other end, however, is preferably provided with a removable and adjustable wall 11 which in the present instance is threaded into the housing and is provided with an annular series of notches 12 to receive a dog 13 formed on a resilient and turnable arm 14 attached to the housing or casing. To assist the expansible washer 5 in automatically maintaining a proper adjustment between the pairs of cones and the roller elements, I prefer to employ a pair of expansible washers 15 and 16 which are interposed between the bases or outer sides of the cones 9 and 10 and the respective walls of the housing, each outer cone being capable of following the corresponding inner cone while the bearing adjusts itself.

The roller elements according to my present invention are each composed of a plurality of axially alined relatively narrow rollers or disks which are of equal diameter or, in other words, each roller element is cylindrical and adapted to bear evenly upon the parallel surfaces presented by the respective pair of inner and outer cones. In the present instance, each roller element is composed of a plurality of rollers or disks 17, each roller or disk having a face which is less in width than the diameter of the roller, and the rollers of each composite roller element are maintained in axial alinement by a cage of suitable form. These rollers may be substantially rigid, but I generally prefer to use rollers which are sufficiently hollow to render them yieldable radially to a degree that will enable them to overcome any diametrical distortion due to the hardening treatment to which they are preferably subjected. The marginal edges of each roller, according to my present invention, are preferably chamfered as at 17ª, so that while in the assembled bearing, the roller of each composite roller element has a line contact with the cone surfaces, the length of the contact is such as will reduce friction to a minimum during the differential rolling action of each roller element, and moreover, there are no burs or relatively sharp edges to wear off the rollers and cause trouble in the bearing. The rollers or sections of each roller element may be of different numbers or widths as shown in Fig. 1, in order that they will be offset relatively in their travel around the conical surfaces.

In Figs. 3 and 4, I have shown a cage which is composed of a pair of inner and outer rings 18 and 19, these rings being connected at suitable intervals by transverse pins 20, and these transverse connecting pins between the rings of each cage form journals or pintles on which the rollers 17 of each composite roller element are freely turnable. The rings 18 and 19 of the cage are preferably dished as shown in order that they may compactly receive and contain the roller elements between them. In Fig. 8, however, I have shown a form of cage wherein it is unnecessary to provide a pintle or journal for the rollers of each roller element, a set of spacing blocks 21 being rigidly united with the rings of the cage in this form and have concave opposed faces 22 which conform to and coöperate with the peripheral surfaces of the rollers 23 which in this form may be imperforate.

In order to guide each cage laterally and to retain the cage and roller elements upon each inner cone after removal from the bearing, I preferably employ a pair of retaining rings 19ª upon each inner cone.

It is generally preferable to so construct the outer cones 9 and 10 that they may expand and thereby adhere and adapt themselves perfectly to the box or housing, thereby avoiding the necessity of grinding the cones and driving them into the box. In Fig. 9, I have shown in detail one of these outer cones which is split at 24 on a diagonal line so as to avoid an abrupt interruption in the cone, and in this instance, the inner circumference of the cone is recessed at 25 and contains a resilient and expansible lining or bushing 26 which is formed of a coiled length of hard metal similar to the bushing or lining 6 for the inner cone, the expansive tendency of this lining or bushing 26 causing the cone 9 or 10 to expand within and adhere firmly to the interior of the box. The ends of the lining are so formed as to avoid an abrupt joint for the roller elements.

The bearing shown in Figs. 1 to 9 inclusive is, as previously stated, adapted for use in those cases where the shaft must sustain a considerable radial pressure and is also subject to end thrust in one or both directions. In practice, the adjustable wall 11 of the housing, after the elements of the bearing have been introduced into the housing, is adjusted so that the cylindrical roller elements will revolve freely between the parallel and oppositely disposed pairs of cone surfaces, care being exercised that there is no lost motion in the bearing. After the bearing has been applied to the shaft, the expansible washers will act to automatically maintain the adjustment, thereby compensating for wear and also insuring even distribution of the load between all of the roller elements. Obviously, in applying the bearing to crank shafts and the like, the inner cones of the bearing must be divided or split in halves, as hereinbefore described, whereas in other instances, it will be unnecessary to split or divide the inner cones.

In Figs. 10 to 14 inclusive, I have shown two forms of bearings wherein the two sets of cylindrical roller elements are arranged in tandem relation, that is to say, they are placed in the same plane, and such a construction is very desirable, if not necessary, in some cases where only a short length of the shaft is available for the bearing. In Fig. 10, a member 27 is fixed to the shaft 28 and is formed with a pair of reversely disposed cone surfaces 29 and 30 which diverge at equal angles. The casing 31 is provided with an outer cone surface 32 which is parallel to the inner cone surface 29, and the outer casing or housing is also provided with a removable and adjustable section 33 which is formed with an outer cone surface 34 which is precisely parallel to the inner cone surface 30. For convenience, the detachable and adjustable section 33 of the housing may be threaded into the body of the housing and it may be secured or held in proper adjusted position by a retaining device such as shown in Figs. 1 and 2. The parts of the housing may also be provided with internal flanges 36 and 37 which overlap the member 27 and felt washers 38 and 39 may be placed within the flanges and thereby serve as dust-excluding means. In this form of the invention, two sets of composite cylindrical roller elements are employed as in the preceding instance. These two sets of roller elements in this form are also guided and contained within a single cage 40. For convenience, the cage may be formed in halves divided diametrically, the halves being duplicates. Each half of the cage in this form of the invention is tubular having a substantially rectangular cross-section, the ends of the cage sections being preferably brought together and lapped and then secured by suitable screws 41. This cage is slotted at appropriate intervals and is fitted with two sets of roller elements 42 and 43 respectively, the roller elements 42 being arranged to coöperate with the inner and outer cone surfaces 30 and 34, while the other set of roller elements 43 is adapted to coöperate with the inner and outer cone surfaces 29 and 32. As the two pairs of cone surfaces are arranged at equal angles, the roller elements which are also in this form of the invention composite will be of cylindrical form with the axes of one set arranged at right angles to the axes of the other set. In this form of the invention, the two sets of roller elements are arranged in tandem so that the bearing will occupy a minimum space lengthwise of the shaft. In practice, the adjustable section 33 of the housing is set so that the member 27 may rotate freely within the housing and without any undue play of the roller elements, and it is adapted for application to the shaft when in this condition. The construction of the bearing is such that it will effectually sustain radial stresses and also end thrust in either or both directions.

The spring ring 16 in Fig. 10 operates upon the outer cone member 31 to automatically establish and maintain proper contact of the two sets of roller elements.

In that form of the invention shown in Fig. 14, the roller elements and cage as shown in the preceding figures may be used. The bearing embodies, however, a pair of laterally opposed members 44 and 45, the member 44 having a groove formed in its face to provide an inner cone surface 46 and an outer cone surface 47, while the member 45 is similarly grooved to form an inner cone surface 48 and an outer cone surface 49, the cone surfaces 46 and 49 being parallel and adapted to coöperate with the roller elements 43, and the cone surfaces 47 and 48 are also parallel and coöperate with the other set of roller elements 42. One of the members (the member 45 in the present instance) is secured within the housing or casing 50 while the other member 44 is adjustably connected to and turnable with the shaft 51. In the present instance, the shaft 51 is threaded at 52 to receive a threaded hub 53 on the member 44 and after the member 44 has been suitably adjusted, a cotter pin 54 may be passed through the hub 53 and the shaft to maintain the adjustment. The housing or casing 50 may also be provided with a flange 55 to rotatably receive the periphery of the member 44 and, in order to exclude dust from the bearing, a packing ring 56 of felt or other suitable material may be interposed between the parts.

In that form of bearing shown in Figs. 1–9 inclusive, it is practicable to form the cone surfaces at a relatively small angle to the axis, and while there will be a differential motion to the rollers or sections of each roller element while following their respective paths on the cone surfaces, twisting friction will be reduced to a minimum, not only because of the relatively small angle of the cone surfaces, but owing to the provision of the narrow-faced and chamfered rollers or sections of each roller element. The parallel conical formation, of course, enables the bearing to sustain not only radial pressure, but also end thrust, the structure being in fact a combined radial load and end thrust bearing.

I claim as my invention:

1. In a roller bearing, the combination of members having inner and outer cone surfaces, a set of roller elements interposed between said surfaces, each roller element being composed of a plurality of relatively narrow independently revoluble rollers, and a cage operative to maintain the rollers of each roller element in axial alinement.

2. In a roller bearing, the combination of members having a pair of inner and outer cone surfaces of equal angles, a set of cylindrical roller elements interposed between said surfaces, each roller element consisting of a plurality of axially alined narrow-faced rollers of equal diameter, and a cage having a set of journals upon which the rollers of each element are revolubly mounted in axial alinement.

3. In a roller bearing, the combination of members having a pair of inner and outer cone surfaces of equal angles, and a cage containing a plural number of hollow flexible narrow-faced rollers of equal diameter interposed between and coöperating with said cone surfaces.

4. In a roller bearing, the combination of a plurality of axially adjustable conical bearing elements of equal angle, and a cage containing narrow-faced cylindrical rollers interposed between and coöperative with said bearing elements, said cage being operative to maintain groups of said rollers in axial alinement.

5. In a roller bearing, the combination of bearing members having conical bearing surfaces of equal angles, composite cylindrical roller elements coöperative with said conical bearing surfaces, each roller element consisting of a plurality of relatively narrow axially-alined disks, and a cage having the disks of each roller element revolubly journaled therein.

6. In a roller bearing, the combination of inner and outer members having opposed conical bearing surfaces of equal angles, roller elements interposed between said members, one of said members containing a resilient and adjustable hardened conical shell adapted to coöperate with the roller elements.

7. In a roller bearing, the combination of conical bearing members, the conical surfaces of which are of the same angle, an annular cage, a set of roller elements carried by the cage, each roller element being composed of a plurality of relatively narrow, axially alined rollers or disks, and means for guiding the cage laterally.

8. In a roller bearing, the combination of a pair of bearing members, and a set of roller elements interposed between them, one of the bearing elements consisting of an annular open ring provided with an annular groove, and a hardened conical shell seated in said groove and forming a conical bearing face to coöperate with the roller elements.

9. In a roller bearing, the combination of opposed bearing members, and a cage interposed between said members and containing a plurality of roller elements, each roller element being composed of a plurality of narrow-faced cylindrical rollers which are maintained in axial alinement by said cage, the roller engaging surfaces of said members being conical and of equal angles and the members being relatively adjustable axially to establish proper rolling engagement between the roller elements and the conical bearing surfaces.

10. In a roller bearing, the combination of an inner bearing member having a conical bearing face, a cage of narrow-faced cylindrical rollers of equal diameter surrounding and coöperative with said conical face, and a flexible outer bearing member provided with a conical bearing face to coöperate with the rollers and having a diagonal cut or opening in its periphery.

11. In a roller bearing, the combination of bearing members having two pairs of inner and outer conical bearing surfaces, the bearing surfaces of each pair being of equal angles, and cages containing two independent sets of composite cylindrical roller elements coöperative with the respective pairs of conical surfaces and adapted to sustain radial stresses and also end thrust in either or both directions.

12. In a roller bearing, the combination of bearing members having two pairs of inner and outer conical surfaces, the conical surfaces of each pair being of equal angles, and two sets of composite cylindrical roller elements coöperative with the respective pairs of surfaces, the axes of the roller elements of said sets converging at opposite points, and a cage interposed between each pair of bearing members and having said roller elements journaled thereon whereby such elements are maintained in proper operative position.

13. In a roller bearing, the combination of conical bearing members and coöperating cylindrical roller elements, and means operative upon both bearing members for adjusting and automatically maintaining the roller elements continuously and in close engagement with the conical bearing members.

14. In a roller bearing, the combination of inner and outer conical bearing members, and an annular series of roller elements arranged in circumferential alinement, the axes of a portion of said roller elements converging at a point at one side of the bearing and the axes of the remaining roller elements converging at a point on the opposite side of the bearing.

15. In a roller bearing, the combination of two axially alined bearing elements, each bearing element being provided with a pair of divergent conical bearing faces, two sets of roller elements interposed between and coöperative with the respective bearing faces, and cages having said roller elements journaled therein.

16. In a roller bearing, the combination of opposed bearing elements having conical bearing surfaces of equal angles, a plural number of narrow rollers interposed between the bearing elements, a cage also inclosed between the bearing elements and having said narrow rollers assembled therein whereby such rollers are guided relatively to each other, and means for automatically maintaining each of said elements and rollers in proper rolling contact.

17. In a roller bearing, the combination of a pair of inner conical members capable of relative axial movement, a pair of outer conical members, roller elements interposed between the inner and outer conical members and adapted to sustain radial stresses and also end thrust in either or both directions, means interposed between the inner conical members for automatically separating them axially, and means operative upon the outer conical members to maintain a close adjustment between the roller elements and the conical members.

18. In a roller bearing, the combination of an inner conical member, a set of cylindrical composite roller elements coöperative with said inner conical member, and an outer conical member having a roller engaging face parallel to the roller engaging face of the inner member and provided with means for automatically moving it axially to maintain a close engagement of the roller elements with the inner and outer conical members.

19. In a roller bearing, the combination of axially adjustable and opposed bearing members having conical bearing surfaces of equal angles, and a conical cage containing narrow-faced cylindrical rollers interposed between said members and coöperative with the conical surfaces thereof, the cage being operative to maintain groups of said rollers in axial alinement.

20. In a roller bearing, the combination of opposed bearing members having conical bearing surfaces of equal angles, a plural number of narrow-faced cylindrical roller elements interposed between and coöperative with the conical surfaces of said members, the edges of the roller elements being chamfered, and means for adjusting the bearing members.

21. In a roller bearing, the combination of opposed bearing elements having conical surfaces of equal angles, a cage containing a plural number of narrow-faced rollers of equal diameters interposed between said bearing elements and coöperative with the conical surfaces thereon, and means for adjusting the bearing elements to maintain proper rolling engagement of the rollers therewith.

22. In a roller bearing, the combination of opposed bearing members having conical surfaces of equal angles, a multiple number of narrow-faced cylindrical rollers with chamfered edges interposed between said bearing members, a cage also interposed between the bearing members and coöperative with said rollers to guide them relatively to each other, and means for automatically maintaining said bearing members and rollers in rolling contact.

23. In a roller bearing, the combination of opposed bearing members having conical surfaces of equal angles, a series of composite cylindrical roller elements interposed between said members, each roller element being composed of a set of disks, and means for assembling the disks in axial alinement and retaining them in the form of a roller.

24. In a roller bearing, the combination of opposed bearing members having conical bearing surfaces of equal angles, a cage interposed between the bearing members and containing a series of independently revoluble composite roller elements which coöperate with the conical surfaces of said members, and means for maintaining the bearing members and the roller elements in contact with each other.

25. A combined radial and thrust roller bearing having conical bearing members, the conical faces of which are of equal angles, a plurality of rollers whose diameters are greater than their axial length and coöperating with said conical members, and means for maintaining said rollers in axial alinement and in the form of a roller element.

26. In a roller bearing, two series of rollers arranged in tandem in an annular path, the axis of each series converging at opposite points, in combination with bearing members having two pairs of conical bearing surfaces to coöperate with the respective series of rollers.

27. In a roller bearing, the combination of relatively adjustable opposed bearing members having conical bearing surfaces of equal angles, a cage containing a plural number of narrow-faced rollers of equal diameter interposed between and coöperating with said conical bearing surfaces, and means for guiding said cage laterally.

28. In a roller bearing, the combination of opposed bearing members having conical bearing surfaces of equal angles, and a cage containing a plural number of hollow flexible narrow-faced rollers of equal diameter interposed between and coöperating with said conical bearing surfaces.

29. In a roller bearing, the combination of relatively adjustable and opposed bearing members having conical bearing surfaces of equal angles, and a cage containing a series of multiple disk roller elements of equal diameter adapted to coöperate with said conical surfaces.

30. In a roller bearing, the combination of opposed bearing members having conical surfaces of equal angles, a cage of hollow flexible narrow-faced rollers with their edges chamfered, interposed between and coöperating with said conical surfaces, and means for retaining the rollers and bearing elements in proper adjustment.

31. In a roller bearing, the combination of relatively adjustable opposed bearing members having conical bearing surfaces of equal angles, and a cage provided with a plural number of narrow-faced rollers of different thicknesses but of equal diameter interposed between and coöperating with said conical surfaces.

32. In a roller bearing, the combination of bearing members having conical bearing surfaces of equal angles and provided with adjustable conical linings, and a cage provided with a plurality of narrow-faced rollers of equal diameter interposed between and coöperating with said conical linings.

33. In a roller bearing, the combination of opposed bearing members provided with adjustable flexible hardened bearing faces, a cage of rollers having their axes converging to a common center and coöperating with said bearing faces, and means for relatively adjusting said rollers and the bearing members.

34. In a roller bearing, the combination of opposed bearing members having conical surfaces of equal angles, a cage containing a plurality of narrow-faced rollers arranged to offset one another with respect to their line of travel, said rollers coöperating with the conical surfaces of said members, and means for retaining and guiding said cage laterally.

35. In a roller bearing, the combination of opposed bearing members one of which consists of an annular ring provided with a diagonal or angular opening, the bearing surfaces of said members being conical, and a cage of rollers coöperative with said bearing surfaces and having their axes converging to a common point.

In testimony whereof I have hereunto set my hand in presence of two subscribing witnesses.

FRANK WHITNEY.

Witnesses:
CLARENCE A. BATEMAN,
CHAS. S. HYER.